(12) United States Patent
Horsfall et al.

(10) Patent No.: US 7,199,066 B2
(45) Date of Patent: Apr. 3, 2007

(54) LAMP REFLECTOR SUBSTRATE, GLASS, GLASS-CERAMIC MATERIALS AND PROCESS FOR MAKING THE SAME

(75) Inventors: William E. Horsfall, Corning, NY (US); Ronald L. Stewart, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/285,673

(22) Filed: Nov. 21, 2005

(65) Prior Publication Data

US 2006/0084561 A1    Apr. 20, 2006

Related U.S. Application Data

(62) Division of application No. 10/804,482, filed on Mar. 18, 2004, now Pat. No. 7,091,141.

(60) Provisional application No. 60/459,845, filed on Apr. 1, 2003.

(51) Int. Cl.
  *C03C 3/093* (2006.01)
  *C03C 10/12* (2006.01)
  *C03C 10/14* (2006.01)

(52) U.S. Cl. ............... 501/67; 501/4; 501/7; 501/63

(58) Field of Classification Search .............. 501/67, 501/4, 7, 59, 63
See application file for complete search history.

(56) References Cited

U.S. PATENT DOCUMENTS

| 5,154,943 | A | 10/1992 | Etzkorn et al. ............ 427/569 |
| 5,236,511 | A | 8/1993 | Etzkorn et al. ............ 118/723 |
| 5,496,586 | A | 3/1996 | Morsen et al. ............ 427/575 |
| 5,503,677 | A | 4/1996 | Morsen et al. ............ 118/723 |
| 6,629,768 | B2 | 10/2003 | Melson et al. ............ 362/311 |
| 6,673,729 | B2 | 1/2004 | Siebers et al. ............ 501/4 |
| 2004/0110623 | A1* | 6/2004 | Hsu et al. ............ 501/7 |
| 2004/0157720 | A1* | 8/2004 | Sakamoto et al. ............ 501/4 |

FOREIGN PATENT DOCUMENTS

| JP | 04-348302 | 12/1992 |
| JP | 04-367538 | 12/1992 |
| WO | WO 03/033960 | 4/2003 |

OTHER PUBLICATIONS

Beall, G.H., Design of Glass-Ceramics, Reviews of Solid State Science, vol. 3, Nos. 3 & 4 (1989) 333-354.
Monch et al., Optimized Light Sources for Projection Displays, Philips Research Laboratories, Aachen, Germany, SID 99 Digest, 1076-1079.

* cited by examiner

*Primary Examiner*—Karl Group
(74) *Attorney, Agent, or Firm*—Siwen Chen

(57) ABSTRACT

The present invention relates to glass, glass-ceramic materials, lamp reflectors and processes for making them. The glass material has a composition, by weight of the total composition, comprising 56–67% $SiO_2$; 9–22% $Al_2O_3$; 3.4–3.8% $Li_2O$; 1.8–2.6% ZnO; 1.5–2.5% MgO; 3.3–5% $TiO_2$; 0–2.5% $ZrO_2$; 1.5–3% $B_2O_3$; 0–6% $P_2O_5$; 0–0.6% F; less than 500 ppm Fe; and components resulting from effective amount of at least one refining agent. The glass-ceramic material of the present invention contains β-spodumene solid solution as the predominant crystalline phase, and can be obtained by proper thermal treatment of the glass-ceramic material.

4 Claims, 12 Drawing Sheets

200 nm 200 nm 200 nm 200 nm 200 nm 500 nm 500 nm 500 nm 200 nm

LAMP REFLECTOR SUBSTRATE, GLASS, GLASS-CERAMIC MATERIALS AND PROCESS FOR MAKING THE SAME

CROSS REFERENCE TO RELATED APPLICATIONS

This application is a divisional application of U.S. patent application Ser. No. 10/804,482, filed on Mar. 18, 2004 now U.S. Pat. No. 7,091,141 and entitled "Lamp Reflector Substrate, Glass, Glass-Ceramic Materials and Process for Making the Same," which, in turn, claims the benefit of U.S. Provisional Application Ser. No. 60/459,845, filed Apr. 1, 2003, entitled "Lamp reflector, glass, glass-ceramic materials and process for making the same," the contents of which are incorporated herein by reference in their entirety.

FIELD OF THE INVENTION

The present invention relates to lamp reflector, glass and glass-ceramic material and process for making the same. In particular, the present invention relates to heat-resistant glass-ceramic lamp reflector substrate for high-pressure arc discharge lamps containing β-quartz or β-spodumene solid solution as a crystalline phase, such glass-ceramic material containing β-quartz or β-spodumene solid solution as the predominant crystalline phase, the precursor glass material and glass lamp reflector substrate, as well as process for making such lamp reflector substrate.

BACKGROUND OF THE INVENTION

Projection display systems use high intensity lamp sources for illuminating through the image generators and optics, then through the projection optics and onto a screen. Preferred lamps for projection displays comprise a high intensity arc discharge lamp positioned within a reflective structure to produce a high intensity light beam. Particularly for digital data projectors and digital projection large screen televisions, these lamps require high temperature stable reflectors due to the small size arcs and resulting light spectrums developed to achieve more balanced color output and high brightness (lumens per square centimeter) on the screen. For portable data projectors the push for shorter arc lamps that produce higher brightness for the same has become a commercial trend.

There are many requirements for the reflector substrate material as a result of the above lamp characteristics. Due to the smaller size of the lamp the material may operate at temperatures up to about 550° C., above the service temperature of low thermal expansion borosilicate glasses. Also starting up or turning off the lamp will lead to higher transient thermal gradients in the reflector substrate creating higher thermal stresses that could lead to fracture. A very low thermal expansion coefficient ($\leq 10 \times 10^{-7}$ K$^{-1}$) material would reduce the thermal stresses from transient thermal gradients so that thermal fracturing would be much less likely to occur.

Another requirement of the reflector substrate material is for infrared heat radiation removal or transfer through the material so less infrared heat radiation is sent along the light path. The reflective surfaces on high intensity lamp reflectors use a multilayer coating, designed to allow transmission of infrared radiation through it, while reflecting the visible radiation. It is known as a cold mirror coating. However, the reflector substrate material needs to also be transmissive to the near infrared (heat) radiation wavelengths to allow the heat removal. This requires a low level of near infrared absorbing species such as transition metal oxides, and especially iron oxides.

In order to have a highly efficient reflective surface the substrate material must have a very smooth surface texture. For a glass-ceramic material this requires a very fine grained (small crystallite size) material. An as-formed smooth surface for the reflector will negate or minimize need for polishing of the surface prior to applying the coating.

For a reasonable manufacturing process the substrate material is best formed by glass forming methods such as pressing into a mold with a precision contour plunger such that the precise contour is transferred and maintained by the glass-ceramic so that the light beam has the required geometry emitted from the lamp. Also it is desirable to lower the melting temperature of any precursor glass while still maintaining good homogeneity and low seed counts. For the needed near IR transmission, use of low iron batch materials is desired.

Various glass-ceramic materials have been proposed to make such lamp reflectors. Japanese patent publication Nos. 1992-367538 and 1992-348302 disclosed glass-ceramic material lamp reflectors having solid solutions of β-spodumene ($Li_2O \cdot Al_2O_3 \cdot 4SiO_2$) and/or β-eucryptite ($Li_2O \cdot Al_2O_3 \cdot 2SiO_2$) as the predominant crystalline phases. Glass-ceramic materials containing β-spodumene and β-eucryptite are known to be heat-resistant materials having low thermal expansion. However, it was stated in Japanese patent publication No. 1992-348302 that the crystallized product, even when started from glass precursor finished with smooth surface, usually could become rough during the crystallization process for forming the β-spodumene or β-eucryptite solid solution. The roughness of the reflector after ceramming could reach 100 mn, and sometimes could exceed 500 nm. A roughness this high is not acceptable for direct deposition of reflective coatings without further polishing of the surface.

Another problem of the prior art glass-ceramic lamp reflector is microcracking on the reflective surface. Such cracking may take place during the ceramming thermal treatment, or during the life cycle of the lamp reflector. Such cracking is normally carried over to the reflective coatings, leading to less efficient light reflection producing poor lumen output consistency.

Therefore, there remains a genuine need of heat-resistant, low thermal expansion, high surface smoothness lamp reflector substrates that can be produced without further surface polishing upon crystallization.

The present inventors have found that glass-ceramic lamp reflector substrates containing β-quartz solid solution as the predominant crystalline phase can be produced by controlling the composition of the precursor glass and the ceramming (crystallization) process. The lamp reflector substrates thus produced have the surface smoothness, heat resistance, thermal expansion and near infrared transmission required for an ultra-high pressure arc discharge lamp.

The present invention is based on this discovery.

SUMMARY OF THE INVENTION

According to one aspect of the present invention, it is provided a glass-ceramic material containing β-spodumene solid solution as a crystalline phase, having a composition, by weight of the total composition, comprising 56–67% $SiO_2$; 19–22% $Al_2O_3$; 3.4–3.8% $Li_2O$; 1.8–2.6% ZnO; 1.5–2.5% MgO; 3.3–5% $TiO_2$; 0–2.5% $ZrO_2$; 1.5–3% $B_2O_3$;

0–6% $P_2O_5$; 0–0.6% F; less than 500 ppm $Fe_2O_3$; and components resulting from at least one refining agent.

Preferably, the glass-ceramic material of the present invention contains 2–4% by weight of $P_2O_5$. According to one embodiment of the present invention, the glass-ceramic material of the present invention contains 0.3–0.5% by weight of F.

The refining agent can be any refining agent known to one skilled in the art used in refining-effective amount, such as $As_2O_3$, $Sb_2O_3$, $SnO_2$, $CeO_2$, chloride, nitrate and sulphate compounds in glass melting. In one embodiment, $As_2O_3$ is used as the refining agent. Preferably, nitrate is used as at least one of the refining agents.

According to another aspect of the invention, it is provided a glass material having the chemical composition of the glass-ceramic material of the present invention. The glass-ceramic material of the present invention can be obtained by proper thermal treatment of this glass material.

In still another aspect of the present invention, it is provided a lamp reflector containing the glass-ceramic or glass material of the present invention.

The lamp reflector of the present invention may be used in connection with a variety of lamps, including, for example, metal halide lamps. Lamp reflectors containing the glass-ceramic material of the present invention are particularly advantageous for, inter alia, high pressure lamps, especially ultra high pressure (UHP) mercury discharge lamps, which typically operate at a high temperature.

In another aspect of the present invention, it is provided a process for making heat-resistant glass-ceramic lamp reflector substrates, comprising the following steps:

(i) mixing raw materials in amounts such that upon melting thereof a glass is produced of a composition by weight of the total glass composition, comprising 56–67% $SiO_2$; 19–22% $Al_2O_3$; 3.4–3.8% $Li_2O$; 1.8–2.6% ZnO; 1.5–2.5% MgO; 3.3–5% $TiO_2$; 0–2.5% $ZrO_2$; 1.5–3% $B_2O_3$; 0–6% $P_2O_5$; 0–0.6% F; less than 500 ppm $Fe_2O_3$; and effective amounts of at least one refining agent, such as $As_2O_3$, $Sb_2O_3$, $SnO_2$, $CeO_2$, chloride, nitrate and sulphate compounds, wherein iron oxide contamination is minimized;

(ii) melting the raw material mixture of step (i) at a temperature up to 1550° C. into melted glass followed by refining and homogenization thereof;

(iii) forming the melted glass of step (ii) into glass moldings of lamp reflector substrates having a reflecting surface with an average surface roughness Ra of less than 75 nm;

(iv) annealing and cooling said glass reflector moldings;

(v) raising the temperature of the glass reflector substrate moldings to a nucleating temperature $T_n$ between 600 and 750° C. and maintaining the moldings in this temperature range for at least 15 minutes;

(vi) raising the temperature of the glass reflector substrate moldings to a ceramming temperature $T_c$ between 700 and 850° C.;

(vii) maintaining the temperature of the reflector substrates at the ceramming temperature for a period of time over 30 minutes to complete crystallization into β-quartz solid solution; and (viii) cooling the reflector substrates to room temperature;

whereby heat resistant glass-ceramic lamp reflector substrates having β-quartz solid solution as the predominant crystalline phase and a reflective surface having an average roughness Ra of less than 75 nm are produced.

Preferably, raw materials are proportioned in step (i) such that the melted glass contains 2–4% by weight of $P_2O_5$.

According to one embodiment of the present invention, raw materials in step (i) are proportioned such that the melted glass contains 0.3–0.5% by weight of F.

In a preferred embodiment, in step (v), $T_n$ is about 650° C. and the glass moldings are brought to this temperature in about 2 hours at about 300° C. per hour; in step (vi), $T_c$ is about 750° C. and the moldings are brought from $T_n$ to $T_c$ in about 2 hours at about 50° C. per hour; in step (vii), the moldings are held at $T_c$ (750° C.) for about 1 to 2 hours to complete the crystallization.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

BRIEF DESCRIPTION OF THE DRAWINGS

In the accompanying drawings.

DETAILED DESCRIPTION OF THE INVENTION

Figure 1:
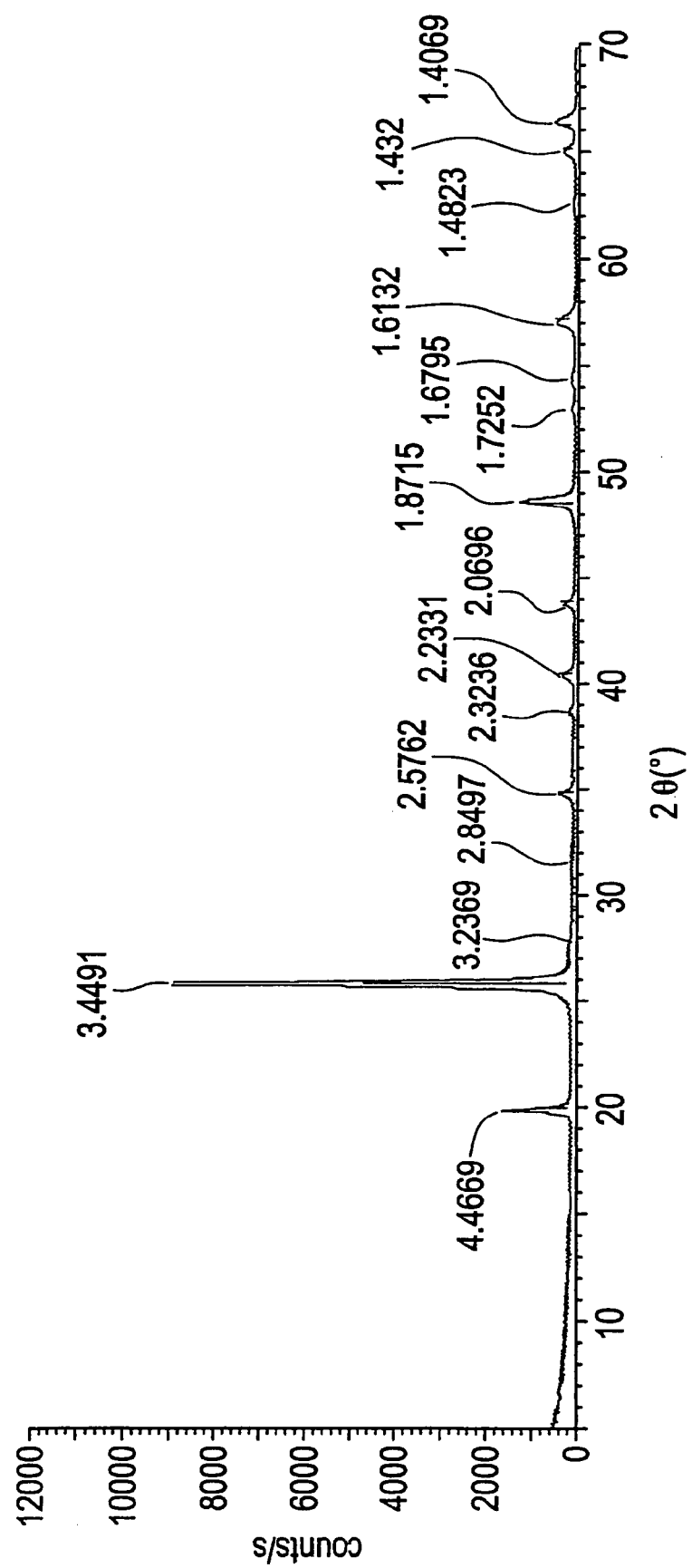
FIG. 1 is an X-ray defractogram of the glass-ceramic lamp reflector substrate of the present invention. The peaks indicate that the predominant crystalline phase of the lamp reflector substrate is β-quartz solid solution.

Projection systems are rapidly improving. A general trend is that the projection systems are becoming more compact. Smaller lamp arcs are required for smaller imaging systems to maintain a high light collection efficiency. Another trend is higher screen lumens (brightness). To achieve high screen lumens, high luminance of the projection lamp is needed. High luminance requires high temperature of the discharge plasma. Ultra-high pressure (UHP) short arc mercury discharge lamps have been developed for high luminance projectors which operate at a pressure of up to 200 bar and a lamp envelope temperature of up to 1100° C. In addition to high luminance, another benefit of UHP mercury discharge lamps is that a more balanced color of the emitted light is obtained. The emission of red light over 595 nm is strongly dependent on the lamp pressure. For example, a 200 bar lamp may give off 20% more red light than a lamp operating at 160 bar.

The use of UHP lamps in compact-size projectors imposes special requirements for the lamp reflectors. First, the reflectors used are becoming smaller in size. Second, because of the high temperatures of the discharge arc and the lamp envelope, the reflectors may have to operate at an elevated temperature of up to 550° C. Moreover, switching the lamp on or off may impart a thermal shock to the reflector substrate. Pyrex-type borosilicate glasses, and even alkaline-earth aluminosilicate glasses do not have high enough operating temperature or low enough thermal expansion to accommodate this requirement. Thermal fracture may result if those glasses are used in such stringent environment. A material having very low thermal expansion during the operation temperature range (room temperature to about 550° C.) of less than $10 \times 10^{-7}$ $K^{-1}$ would be highly desired for the reflector. A third requirement of the lamp reflector is precise surface contour, such as parabolic or elliptical, for effective light collection and reflection. Fourth, also for the purpose of effective light reflection, high surface smoothness of the reflective surface is required. Since the reflective layer coated on the reflector substrate is usually very thin, the reflective surface will bear the surface flaw or irregularity of a reflector substrate. Therefore, the reflector substrate has to have a very smooth inner surface before coating of the reflective layers. Microscopic coarse crystal grains, micro-fissures and contaminants on the reflective surface, even though invisible to the naked eye, may decrease the efficiency of the illumination system and may even cause failure. A fifth requirement for the lamp reflector is its transmissivity at infrared and near-infrared wavelength. A substantial portion of power consumed by the UHP arc discharge lamp is emitted as infrared and near infrared light. It is desired that these "hot" light rays not be reflected by the lamp reflector into the light path together with the visible light, but be transmitted through the reflective layers and the reflector wall and dissipated.

The processes for making such glass-ceramic lamp reflectors generally comprise the follow steps: melting the glass; forming melted glass into moldings of reflector substrates; heating the cooled glass moldings to a nucleation temperature where crystal nuclei grow; further heating the moldings to a crystallization temperature (ceramming) to convert the glass moldings to glass-ceramic lamp reflector substrates having a low thermal expansion; drilling holes for electrode leads; coating reflective layers onto the reflective surface for the finalized lamp reflectors, on which UHP mercury arc discharge lamps will be mounted.

Figure 2:
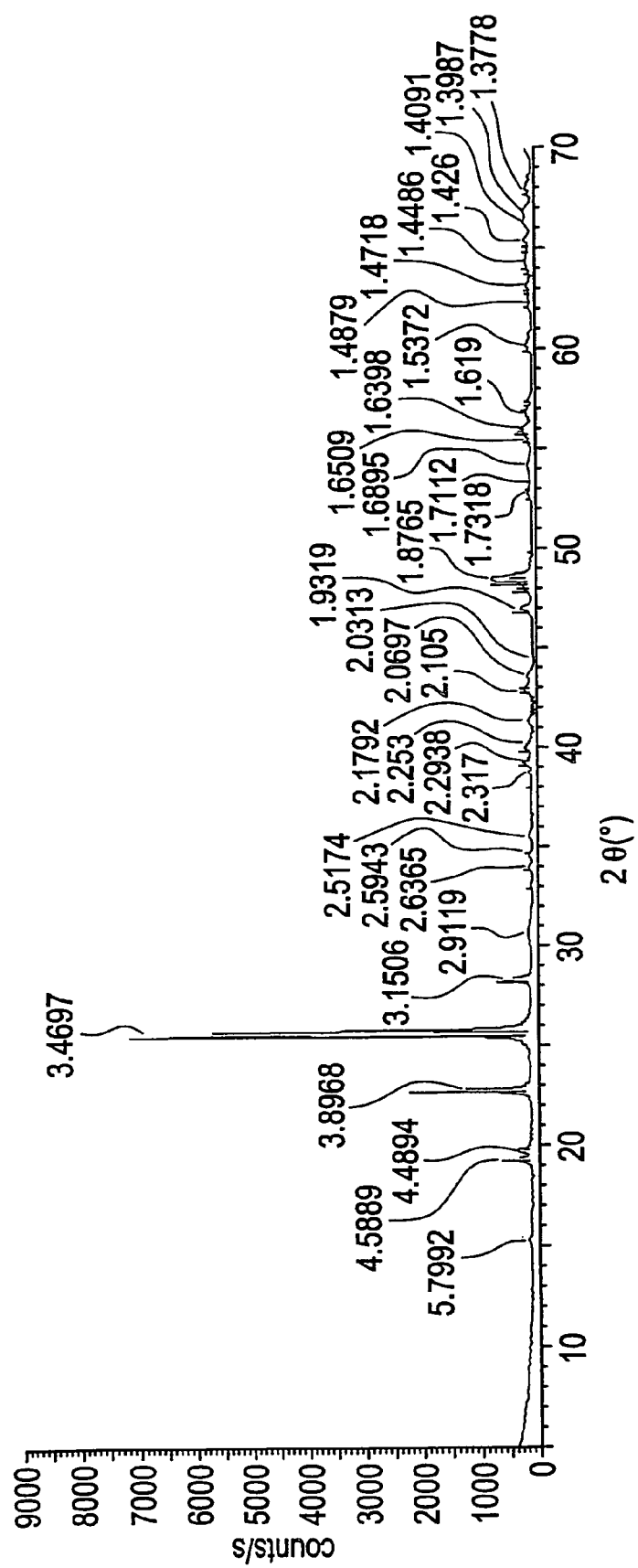
FIG. 2 is an X-ray defractogram of the glass-ceramic lamp reflector substrate in the prior art. The peaks indicate that the predominant crystalline phase of the lamp reflector substrate is β-spodumene solid solution.

Literature disclosing such glass-ceramic reflectors and processes for making the same includes Japanese patent publication Nos. 1992-367538 and 1992-348302, described supra. The predominant crystalline phases as disclosed in these two references were β-spodumene and/or β-eucryptite solid solutions. An XRD analysis of a product available from Okamoto, Japan, indicates that indeed the predominant crystalline phase in the reflector substrate is β-spodumene solid solution, with small amounts of β-eucryptite solid solution. FIG. 2 is the XRD graph of this product. The product is milky white. Whereas such glass-ceramic lamp reflector substrate can be produced and used for UHP lamps, it is also known that crystals formed in the reflectors may be exceedingly coarse, rendering the roughness of reflective surface unacceptable for direct coating of the reflective layers without further polishing. However, further polishing of the formed glass-ceramic reflector substrate is costly and difficult, adding to the final cost of the product.

The present inventors have discovered that glass-ceramic lamp reflector substrates having β-quartz solid solution as the predominant crystalline phase can be produced with very good properties. The as-formed lamp reflectors have the desired characteristics above, especially a good surface smoothness of less than 75 nm without the need of further surface polishing. The lamp reflectors especially suit the need of UHP operating at a high temperature. The reflector can be made with a compact size accommodating the miniaturization trend of the illumination system of projectors.

The glass-ceramic material of the lamp reflector of the present invention comprise, expressed in terms of weight percentage: 56–67% $SiO_2$, 19–22% $Al_2O_3$; 3.4–3.8% $Li_2O$; 1.8–2.6% ZnO; 1.5–2.5% MgO; 3.3–5% $TiO_2$; 0–2.5% $ZrO_2$; 1.5–3% $B_2O_3$; 0–6% $P_2O_5$; 0–0.6% F; less than 500 ppm $Fe_2O_3$, as well as components resulting from at least one refining agent in refining-effective amount, such as $As_2O_3$, $Sb_2O_3$, $SnO_2$, $CeO_2$, chloride, nitrate and sulphate compounds. Preferably, the glass-ceramic material of the lamp reflector of the present invention contains 2–4% $P_2O_5$. According to one embodiment of the present invention, the glass-ceramic material of the present invention contains 0.3–0.5% F. The glasses for the lamp reflector substrate of the present invention can typically be melted at a temperature below 1550° C., making it possible to melt in a relatively small commercial glass tank. The addition of $B_2O_3$ and $P_2O_5$ is conducive to the low melting temperature. Adding $P_2O_5$ has several advantages. First, it helps in reducing the glass melting temperature. Second, it imparts better liquidus properties of the glass, which is beneficial for the forming process of the lamp reflector substrates. In addition, it contributes to the nuclei formation during the ceramming cycle. Thus adding $P_2O_5$ in the amount of 2–4% by weigh of the composition can help produce glass-ceramic substrates with a highly smooth surface. It has also been discovered that both the composition of the glass and the crystallization process affect the surface smoothness of the finalized glass-ceramic lamp reflector substrates. For glasses outside of this compositional range, even if glass moldings can be formed with a acceptable smoothness of the reflective surface, often the reflective surface becomes too coarse during the crystallization process because crystal grains grow exceedingly large on or near the surface or because micro-fissures (or micro cracks) are created. The present inventors have unexpectedly discovered that, by adding F to the batch material and controlling its content between 0.3–0.5% of the final glass composition, micro-fissures can be notably reduced during the crystallization process. Controlling the $Li_2O$ content between 3.4–3.8% in the glass batch is conducive to the formation of β-quartz solid solution crystalline phase. To control the IR and near IR transmissivity of the glass-ceramic lamp reflector substrate of the present invention, it is important that the batch materials are substantially free of IR absorbing components, such as FeO, CuO, etc. Therefore, low iron sand is preferred in the batch as a $SiO_2$ source. It is also desired that iron contamination during the glass melting process is avoided as much as possible. Typically, the iron content expressed in terms of parts per million by weight of $Fe_2O_3$ in the glass-ceramic material of the present invention should be controlled below 500 ppm. In reality, the iron present in the glass-ceramic material may be in +2 or +3 valency. It is desired that as much iron as possible is in +3 state. The amount of $TiO_2$ and $ZrO_2$ as nucleation agents in the glass can greatly affect the crystallization rate and the crystal grain size. Thus it is important to control their ranges to the ones described above.

Upon proper crystallization, glass moldings of lamp reflector substrates having the above composition will crystallize to form the glass-ceramic reflector substrates. The cerammed lamp reflector substrate of the present invention has a translucent gray or transparent tan color. Typically, glass-ceramic material containing β-spodumene solid solution as the predominant crystalline phase is milky white. It has been proved by XRD that the predominant crystalline phase of the glass-ceramic lamp reflector substrates of the present invention is β-quartz solid solution. The β-quartz solid solutions are metastable hexagonal crystalline phases of very low coefficient of thermal expansion. Its general composition is $(Li_2,R)O \cdot Al_2 \cdot nSiO_2$, where n varies from 2–10 and R is a divalent cation normally $Mg^{2+}$ or $Zn^{2+}$.

The glass-ceramic lamp reflector substrates of the present invention are produced by (i) mixing batch materials with the proper proportions; (ii) melting the batch mixture in a glass tank and homogenizing and refining the melted glass; (iii) forming the melted glass into glass moldings having a roughness Ra of the reflective surface of less than 75 nm; (iv) annealing the glass moldings; (v) heating the cooled glass moldings to nucleation temperature where crystal nuclei are formed; (vi) further heating the glass-moldings to the crystallization temperature where they are cerammed; and (vii) cooling and annealing the formed glass-ceramic lamp reflector substrates. The temperature-temporal profile of steps (v) and (vi), viz., the nucleation and crystallization steps, in addition to the glass composition, determines the crystalline phases, their assemblage and grain sizes, hence the final quality, of the final glass-ceramic lamp reflector substrates.

As mentioned above, in order to achieve good IR and, in particular, near IR transmissivity of the final lamp reflector substrate, it is required that the batch materials are substantially free of IR and near IR absorbing components. Thus, low iron content sand is preferred as a $SiO_2$ source. Prior acid treatment may be necessary to reduce the iron level of the sand and other batch materials. It is important to make sure that the treatment of the batch materials per se does not introduce iron oxides. Anhydrous boric acid may be used as the source of $B_2O_3$. Spodumene, fine alumina, and Al-metaphosphate may be used as the starting materials. In one embodiment of the present invention, the glass is refined by $As_2O_3$. It is preferred that the glass is oxidized. In one preferred embodiment, nitrate, such as $NH_4NO_3$, is used as at least one of the refining agents. Nitrates may also oxidize the trace amount of $Fe^{2+}$ into $Fe^{3+}$ in the glass. Because IR absorption of iron oxide is caused by $Fe^{2+}$, but not by $Fe^{3+}$, the use of nitrate can improve the IR transmission property of the glass and glass-ceramic material of the present invention. One skilled in the art can calculate the amount of batch materials used according to the projected final composition of the glass-ceramic material. The mixed batch materials are then charged into a glass tank and melted according to conventional glass melting process. One skilled in the glass melting art can adjust the composition of the batch within the above described compositional range to fine tune the melting ease of the glass in order to accommodate the operating capacity and temperature of the glass melting tank. The molten glass can be homogenized and refined using conventional methods. Whilst some glasses having a melting temperature over 1600° C. can crystallize to form β-quartz solid solution glass-ceramic material, such high temperature melting usually has to be carried out at large and expensive melting tanks. In addition, the liquidus behavior of such high melting temperature glass usually requires higher temperature pressing and molding. The glass material therefore in and of itself constitutes one aspect of the present invention.

The homogenized, refined and thermally uniform molten glass is then delivered to high temperature molds and formed into glass lamp reflector substrate moldings. To achieve a surface roughness Ra of less than 75 nm and a precise surface contour, precision plungers are required to press the glass gobs filled in the molds. It is also required that the plungers will not introduce IR absorbing oxides or other defects onto the surface of the reflector substrates. The moldings are then removed from the molds and transferred to a glass annealer to remove enough stress in the moldings for further processing. Thereafter, the cooled glass moldings are inspected, analyzed of chemical and physical properties for quality control purpose. Surface roughness and contour are tested. Generally, the reflecting surface of the substrate should have a smooth and precise parabolic or elliptical contour. Theses glass moldings can be used without further ceramming as lamp reflector substrates, subject to further finishing steps, such as coating of reflective coating, in certain applications where Pyrex-type borosilicate glass materials suffice. Owing to the high surface roughness and precise contour, these glass lamp reflectors offer high and consistent lumen output. These glass lamp reflector substrates constitute another aspect of the present invention.

To produce the glass-ceramic lamp reflector of the present invention, the thus prepared glass moldings are placed into a ceramming kiln to undergo the crystallization process. The temperature-temporal profile of the kiln is programme controlled and optimized to ensure that the glass moldings are formed into glass-ceramic lamp reflector substrates having β-quartz solid solution as the predominant crystalline phase, with a reflective surface roughness of lower than about 75 nm. As described above, the glass composition and the thermal history during the ceramming process determine the final crystalline phases, their assemblage and crystallite sizes in the final product. Generally, the glass moldings are first heated to a nucleation temperature $T_n$ where crystal nuclei start to form. Subsequently, they are heated to an even higher maximum ceramming temperature $T_c$ where the crystals grow on the nuclei. Crystal nuclei continue to form during the process of heating from $T_n$ to $T_c$. It is often desired to keep the moldings at $T_c$ for a period of time so that crystallization reaches a desired extent to avoid surface microcracking. In order to obtain the glass-ceramic lamp reflector substrates of the present invention, the nucleation temperature $T_n$ is between 600–750° C. and the maximum ceramming temperature $T_c$ is between 700–850° C. It is believed that higher $T_c$ may lead to an irreversible transformation of β-quartz solid solution to β-spodumene in the glass-ceramic material. Such transformation is usually accompanied by an increase in crystallite size (usually five- to tenfold). Large crystallite size is likely to lead to coarse reflective surface. Therefore, $T_c$ should be generally controlled below 850° C. in order to obtain β-quartz solid solution as the predominant crystalline phase. In addition to β-quartz solid solution, other crystalline phases in minor amounts, such as rutile and gahnite, may be produced as well in the glass-ceramic material of the present invention. After ceramming, the moldings are allowed to exit the ceramming kiln and cooled to room temperature. One skilled in the art can adjust $T_n$, $T_c$ and the temperature-temporal profile of the ceramming cycle to accommodate the different glass compositions within the above-described range. Average crystallite size in the glass-ceramic material of the present invention may be lower than 35 nm. The cooled glass-ceramic reflector substrates are translucent gray or transparent tan. Holes for electrodes of the discharge lamps are then drilled through the lamp reflector substrates.

To prepare a lamp reflector on which an arc discharge lamp can be mounted, reflective layers are lastly coated on the reflective surface. Such coatings can advantageously be multiple PICVD (Plasma Impulse Chemical Vapor Deposition) reflective coatings. This coating process is particularly suitable for three-dimensional substrates such as the lamp reflector substrate. An example of PICVD coating comprises over 100 layers of $SiO_2$ and $TiO_2$, both resistant to heat. The reflective coatings can also be formed using electron beam evaporation or sputter coating. The resulting reflective coating can be made reflective to visible light, but transmissive to IR and near IR wavelength. Such coatings are called cold mirror coatings. The IR light then transmits through the wall of the glass-ceramic lamp reflectors, and is further dissipated as heat.

The glass and glass-ceramic materials of the present invention are described in connection with lamp reflectors. Lamp reflectors made of the glass material of the present invention may be employed in applications where operational temperature is relatively low, such as within the normal operational temperature of Pyrex-type borosilicate glasses. Lamp reflectors made of the glass-ceramic material of the present invention may be employed in, in addition to traditional projection displays, applications using UHP lamps. However, it is to be understood that the glass and glass-ceramic material of the present invention may find application in other devices as well. For example, the glass-ceramic material may be employed as cooktop, countertop, and building materials, where its properties are called upon.

The following non-limiting examples further illustrate the present invention. However, it is to be understood that they are for the purpose of illustration only. Therefore, the present invention as claimed shall not be construed to be limited to these examples.

EXAMPLES

Example 1

Glasses having the following compositions in TABLE I were prepared using traditional glass-melting method. Glass C1 is a comparative example in that it does not contain $B_2O_3$ or $P_2O_5$, and the $SiO_2$ content is higher than the glasses for the glass-ceramic lamp reflectors of the present invention. Glasses of Examples 1–7 and 9–10 are for the glass and glass-ceramic lamp reflector substrates of the present invention. Glass C2 does not contain the amount of ZnO as required and is also a comparative example.

Homogeneous glass was melted from oxide, carbonate, and/or fluoride raw materials at 1550° C. for 6 hours in covered Pt crucibles. The glass was made into coarse powder by pouring into water. This glass powder was re-melted in Pt crucibles at 1600° C. for 5 hours before stirring with a Pt stirrer. The glass was placed in the furnace again for one hour to fine out any bubbles, caused by stirring, before pouring the glass onto a steel slab table. The glass was annealed at 650° C. to remove stress. Small samples were sawn from the finished glass patties, and subjected to various ceram thermal cycles in a progammable oven. The ceramming condition and properties of the resulting glass-ceramic materials were reported in TABLE II. The crystalline phase information of the glass-ceramic materials were obtained by XRD.

It is to be understood that though the tests on these examples were conducted on a laboratory scale, they can be carried out in large commercial glass tanks and ceramming kilns by one of skill in the art.

TABLE I

| | Glass No. | | | | | | | | | | |
|---|---|---|---|---|---|---|---|---|---|---|---|
| | C1 | 1 | 2 | 3 | 4 | 5 | 6 | 7 | C2 | 9 | 10 |
| $SiO_2$ | 68.1 | 64.79 | 64.4 | 63.49 | 62.19 | 62.79 | 62.29 | 60.79 | 55.43 | 62 | 60 |
| $Al_2O_3$ | 19.3 | 20 | 19.9 | 21 | 22 | 20 | 20 | 20 | 24.2 | 20 | 20 |
| $Li_2O$ | 3.45 | 3.6 | 3.6 | 3.9 | 4.2 | 3.6 | 3.6 | 3.6 | 3.3 | 3.6 | 3.6 |
| MgO | 1.2 | 1.8 | 1.8 | 1.8 | 1.8 | 1.8 | 1.8 | 1.8 | 1.4 | 1.8 | 1.8 |
| ZnO | 1.62 | 2.2 | 2.2 | 2.2 | 2.2 | 2.2 | 2.2 | 2.2 | 1 | 2.2 | 2.2 |
| BaO | 0.8 | — | — | — | — | — | — | — | — | — | — |
| $TiO_2$ | 2.6 | 4.3 | 4.3 | 4.3 | 4.3 | 4.3 | 4.3 | 4.3 | 2.5 | 4.3 | 4.3 |
| $ZrO_2$ | 1.7 | — | 0.5 | — | — | — | 0.5 | — | 2.5 | — | — |
| $B_2O_3$ | — | 2 | 2 | 2 | 2 | 2 | 2 | 2 | — | 2 | 2 |
| $P_2O_5$ | — | — | — | — | — | 2 | 2 | 4 | 7.9 | 2 | 4 |
| $As_2O_3$ | 0.85 | 1 | 1 | 1 | 1 | 1 | 1 | 1 | — | 1 | 1 |
| $Sb_2O_3$ | — | — | — | — | — | — | — | — | 1.5 | — | — |
| $Na_2O$ | 0.14 | 0.22 | 0.22 | 0.22 | 0.22 | 0.22 | 0.22 | 0.22 | 0.26 | 0.22 | 0.22 |
| $K_2O$ | 0.17 | 0.06 | 0.06 | 0.06 | 0.06 | 0.06 | 0.06 | 0.06 | 0.06 | 0.06 | 0.06 |
| F | — | — | — | — | — | — | — | — | — | 0.5 | 0.5 |
| Viscosity (P) @ 1550° C. | 610 | 280 | 270 | 210 | 170 | 250 | 240 | 230 | 280 | 230 | 210 |
| Liquidus Temp. (° C.) | 1350 | 1240 | 1240 | 1255 | 1265 | 1235 | 1215 | 1205 | 1385 | 1235 | 1200 |
| Viscosity (kP) @ Liquidus T | 7 | 11 | 10 | 7.5 | 4 | 10 | 13 | 11 | 1.7 | 8.5 | 13 |

TABLE II

| | Glass No. | | | | | | | | | | |
|---|---|---|---|---|---|---|---|---|---|---|---|
| | C1 | 1 | 2 | 5 | 5 | 6 | 6 | 7 | 7 | 7 | 10 | 10 |
| $T_c$ (° C.) | 900 | 750 | 800 | 750 | 800 | 750 | 800 | 750 | 750 | 750 | 750 | 750 |
| Time @ $T_c$ (min) | 30 | 120 | 120 | 120 | 120 | 120 | 120 | 30 | 60 | 120 | 60 | 120 |
| $T_n$ (° C.) | 800 | — | — | — | — | — | — | 600 | 600 | 650 | 600 | 650 |
| $CTE_{25-475° C.}$ ($\times 10^{-7} K^{-1}$) | 1 | — | — | 1.7 | 6.1 | — | — | — | 3.7 | 2.7 | 8.7 | 9.3 |
| Crystalline Phases* | P2 | P1 P2 (sl) | P3 P2 P4 (sl) P5 (sl) | P2 | P2 P3 P4 (sl) P5 (sl) | P2 | P2 P3 P4 (sl) P5 (tr) | P2 P1 | P2 | P2 P4 (tr) P5 (tr) | P2 P4 (tr) P5 (tr) | P2 P4 (tr) P5 (tr) |

*Phases listed in order of amount present (peak intensities).
sl: slight amount; tr: trace amount.
P1: glass; P2: β-quartz; P3: β-spodumene; P4: grahnite; P5: rutile.

From the data in TABLE I, it can be seen that glasses 1–7 and 9–10 have lower viscosity at 1550° C. than the comparative glass C1. Though C1 could be cerammed into glass-ceramic material having β-quartz solid solution as the predominant crystalline phase, its high melting and liquidus temperatures rendered it undesirable as the precursor glass for the glass-ceramic lamp reflector substrates of the present invention. In fact, the entire high temperature versus viscosity relationship for glasses 1–7 and 9–10 show lower viscosities than Glass C1 over the range of 1000–1550° C. The composition information shows that this lower viscosity across his range was achieved primarily through additions of $B_2O_3$ and $P_2O_5$ to the comparative glass C1. It is also shown that more viscosity reduction may occur with further addition of fluorine to the compositions. Also from TABLE I the liquidus temperature comparisons show that glasses 1–7 and 9–10 have a substantially lower temperature at the liquidus than the comparative glasses C1 and C2, and that several of them have a somewhat higher viscosity at the liquidus temperature. Both these results indicate some advantage of the glasses 1–7 and 9–10 in pressing to form the reflector shape.

From TABLE II, it is indicated that the final crystalline phase and assemblage is dependent on not only the glass composition, but also the temperature-temporal profile of the ceramming cycle. For cycles having a maximum ceramming temperature 750° C. at 120 minutes, Glass 1, which had only added $B_2O_3$, was found to remain primarily glassy. With the same thermal cycle Glasses 5 and 6 produced only β-quartz solid solution crystalline phase, with the pieces maintaining good transparency, and a smooth air surface of high reflectivity. These glasses had $P_2O_5$ in addition to the $B_2O_3$ of Glass 1. $P_2O_5$ apparently aids in the nucleation and growth of β-quartz solid solution phase in these glasses. Glasses 7 and 10 also show that β-quartz solid solution is predominant for 750° C. maximum temperature hold cycles. When thermal cycles have an 800° C. maximum temperature, additional phases appear in the X-ray diffractogram. Generally β-spodumene appears as another $Li_2O-Al_2O_3$-$SiO_2$ phase with β-quartz solid solution when the maximum ceramming temperature is high. Some small amounts of gahnite ($ZnAl_2O_4$—spinel) and rutile ($TiO_2$) are present when β-quartz solid solution is the predominant crystalline phase. It was also found that glass-ceramic material having β-quartz solid solution as the predominant crystalline phase tended to have a lower thermal expansion than those having β-spodumene solid solution as the predominant crystalline phase. This, among others, contributes to the advantages of glass-ceramic materials containing β-quartz solid solution as the predominant crystalline phase.

Example 2

Figure 3:
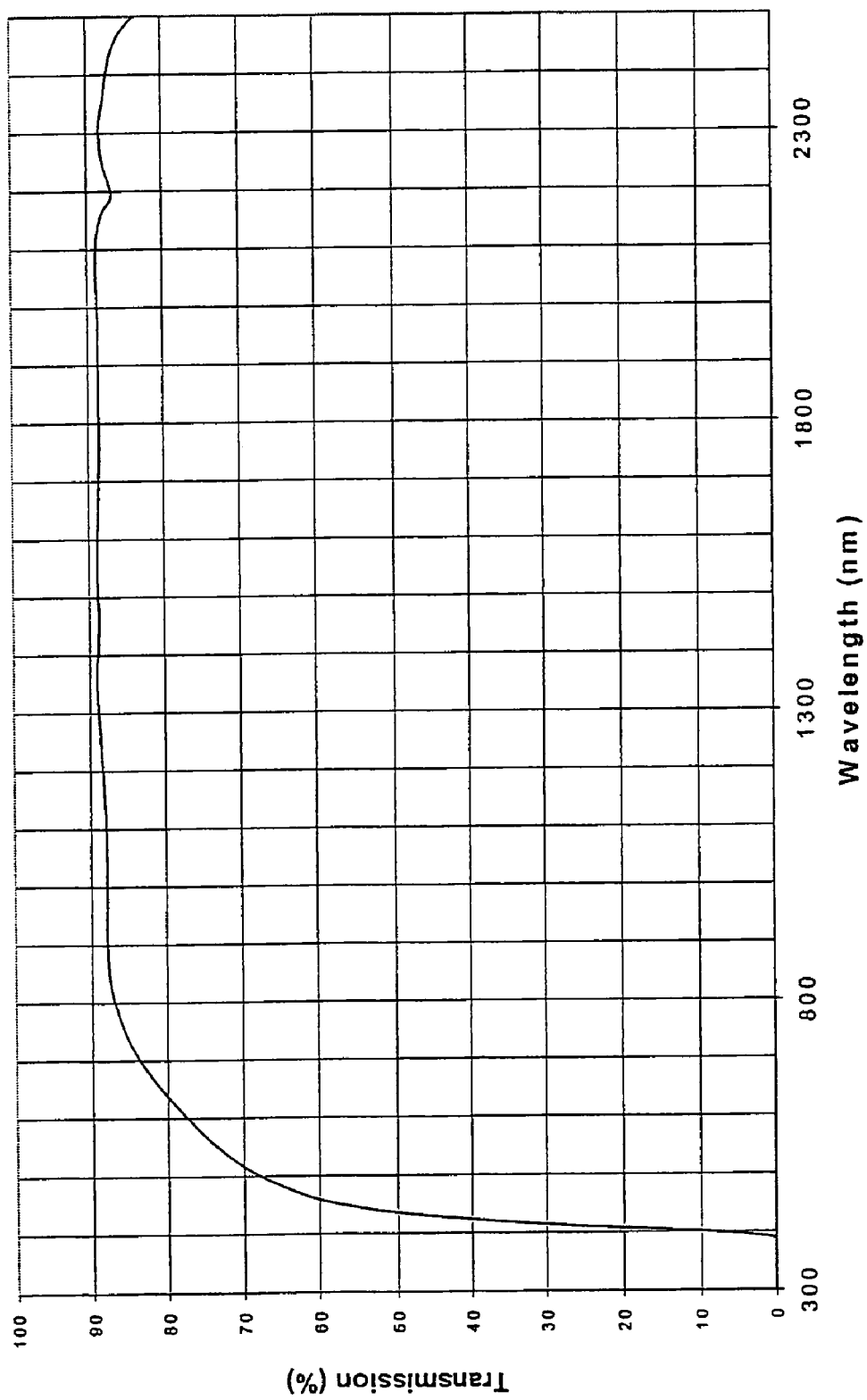
FIG. 3 is a light transmission curve of a glass-ceramic lamp reflector substrate of the present invention, having a wall thickness of about 3 mm and not coated with the cold mirror coatings.

A glass lamp reflector substrate having an elliptical reflective surface and a wall thickness of about 3 mm was formed from Glass 7 of Example 1. The glass was melted in a commercial glass tank. It was then cerammed with a $T_n$ of 650° C., a $T_c$ of 750° C. and a maintenance period of 60 min at $T_c$. Light transmission property of thus obtained glass-ceramic lamp reflector substrate was measured and a transmission curve was provided in FIG. 3. It shows the glass-ceramic lamp reflector substrate had a IR transmission at 1050 nm of over 80% at a thickness of about 3 mm. XRD analysis showed it had β-quartz solid solution as the predominant crystalline phase. Measured average surface roughness was below 70 nm. No surface micro-cracking was observed. Contour was measured to be precise. The lamp reflector substrate was then coated with multiple cold mirror coatings. Test showed it was fit for long-term use at 600° C., it had high lumen output consistency and no micro-cracking on the reflective surface appeared during the test.

Example 3

In this example, four glass patties were collected as gobs from the glass melting tank during a trial pressing run. They were about twice the weight of glass as the pressed glass reflectors being made during this developmental furnace, pressing and ceramming run. These patties were annealed in the lehr used for the pressings. They were then cut into halves. One half of each patty was cerammed in the kiln along with pressed pieces on the thermal treatment schedule selected for the reflector pieces. These samples of the patty glass and corresponding glass-ceramic (representing the material in the present invention) were characterized by using AFM (Atomic Force Microscopy) to determine if surface roughness changed upon ceramming of the glass used for the subject reflectors. For all the glass and the cerammed glass from the sample patties, the surface roughness was determined on what was the original air side of each patty.

These patty made samples, of the reflector substrate material, were measured for average surface roughness (Ra) by using AFM on two 2×2 μm areas and two 20×20 μm areas, respectively. Surface roughness of the glass-ceramic substrates was then measured by using AFM on two 2×2 μm area and two 20×20 µm area, respectively. Data of surface roughness showed that surface roughness of the lamp reflector material did not change appreciably after ceramming.

Example 4

In this example, two glass-ceramic lamp reflector substrates of the present invention were characterized by using TEM (Transmission Electronic Microscopy). Samples were prepared by cutting two lamp reflectors of the present invention (prepared according to slightly different ceramming schedules) to reveal the cross-section of the reflector substrates. These cross-sections were then made into thin sections by microtome and subsequent argon ion milling. TEM images of the samples were then obtained.

Figure 4:
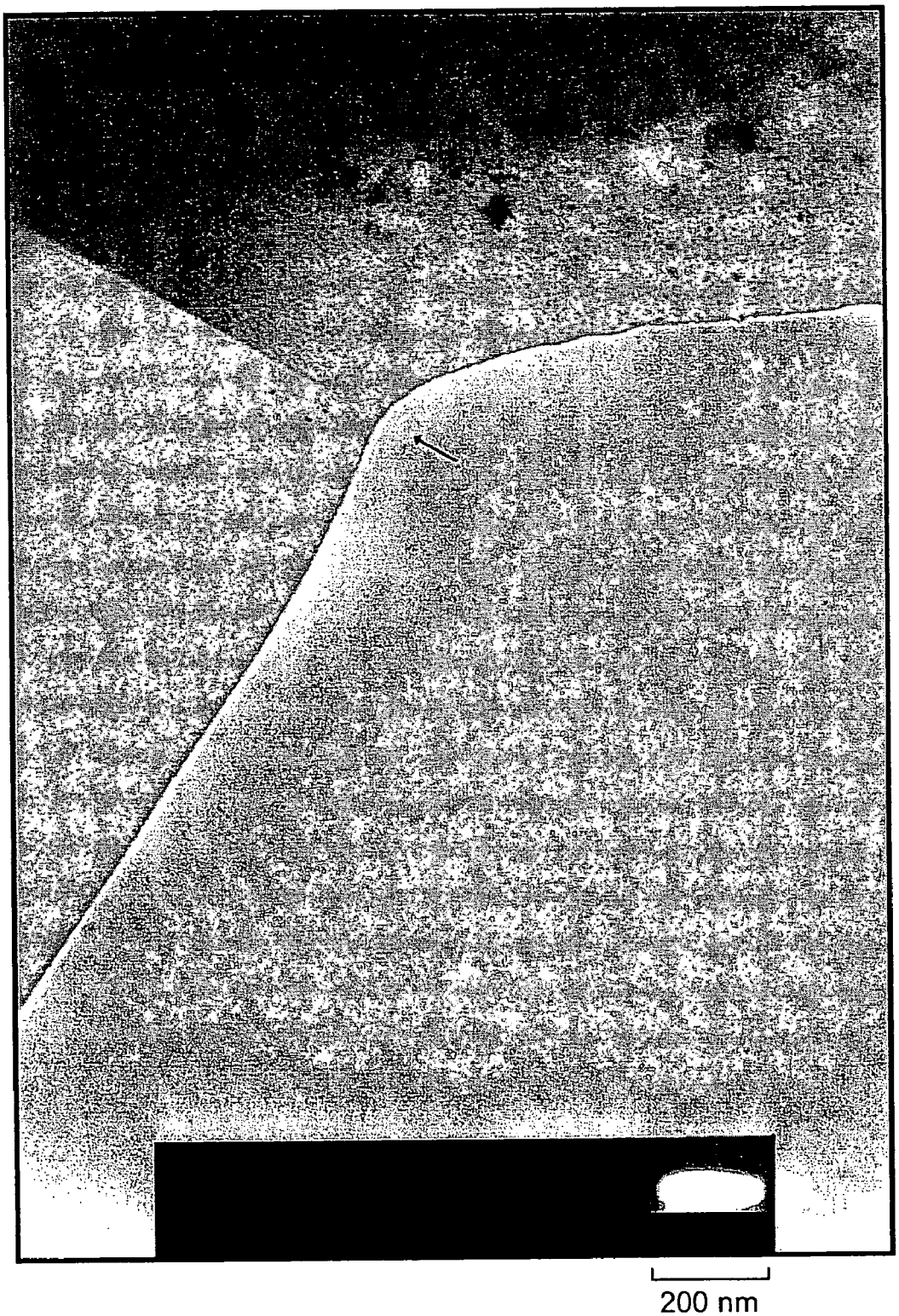
FIGS. 4, 5 and 6 are cross-sectional TEM photomicrographs of sample glass-ceramic lamp reflector substrates of the present invention.
Figure 5:
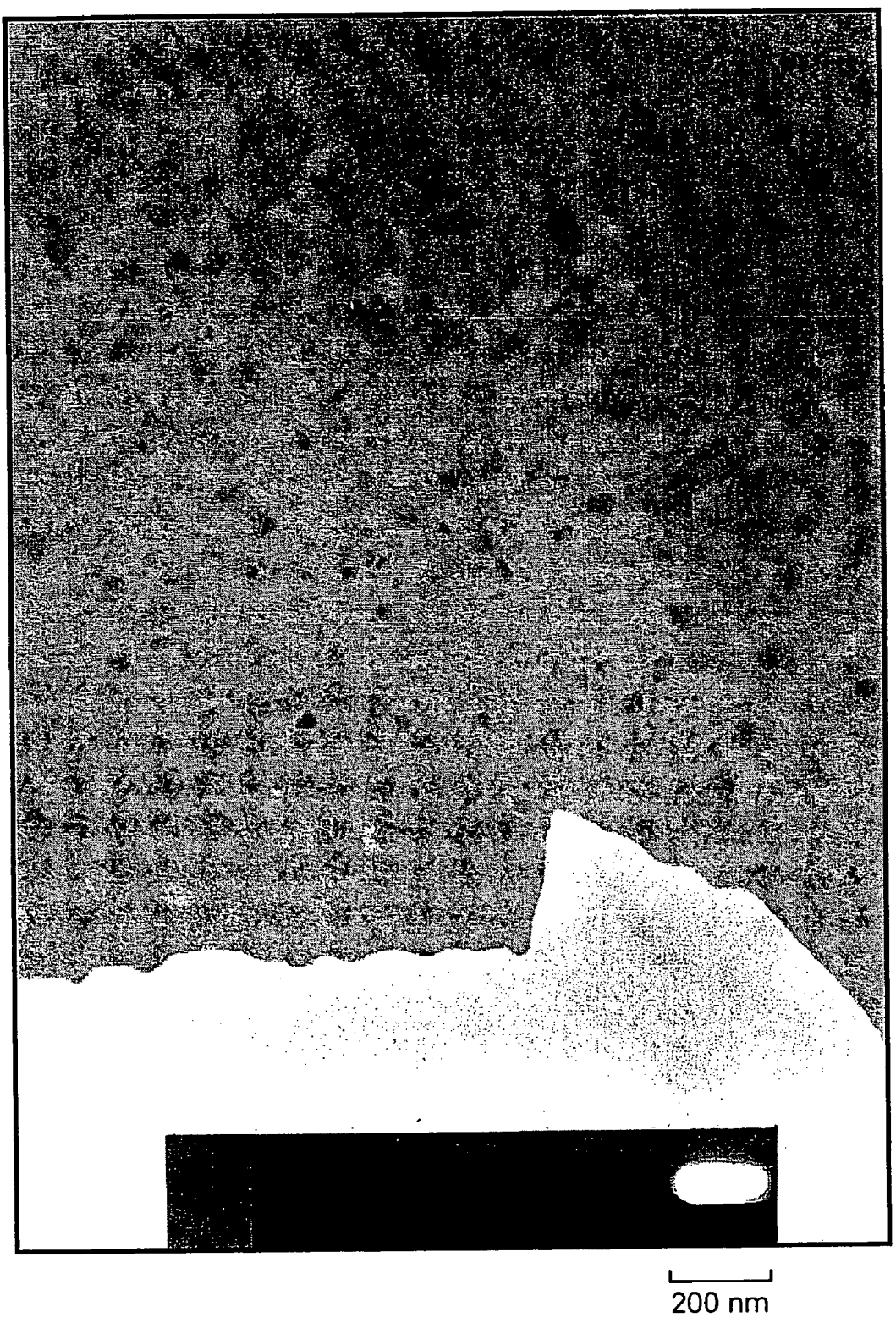

FIGS. 4 and 5 are the cross-section TEM image photomicrographs of a sample glass-ceramic lamp reflector of the present invention. The arrow in FIG. 4 points to the surface position of the sample. Many ceramic crystal grains can be observed in FIG. 4. The distance between the surface and nearest grains is less than 100 nm. It is believed that the layer between the surface and the grains is a glass layer comprising essentially a glassy phase. FIG. 5 is an image of the ceramic crystal grains inside the specimen. The image shows that he sizes of the crystal grains are in the range of 20 nm to 60 nm.

Figure 6:
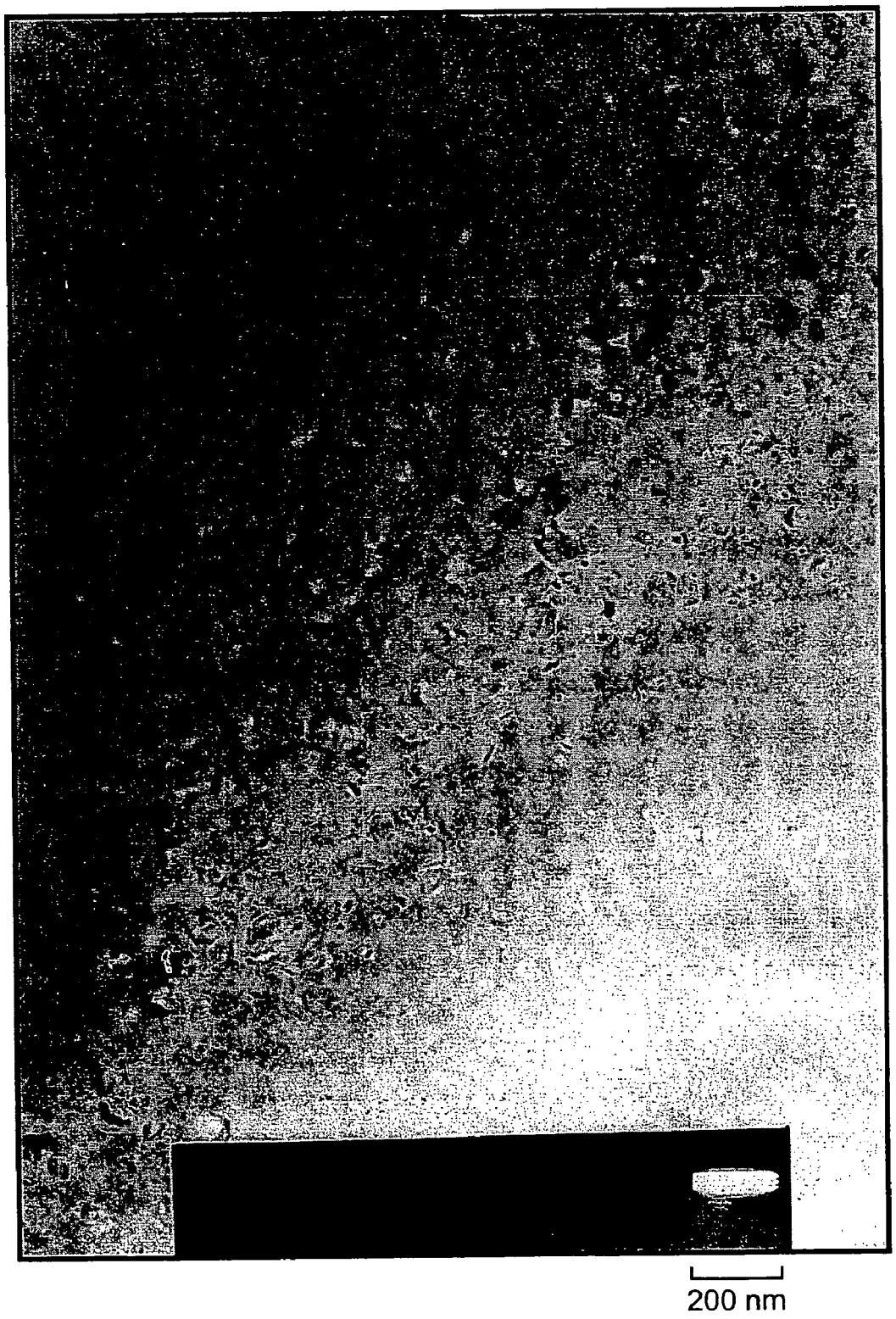

FIG. 6 is the cross-sectional TEM image of another glass-ceramic lamp reflector substrate of the present invention. Similar to FIG. 4, ceramic crystal grains near the surface of the specimen were observed. However, the surface of the sample is not shown in the image.

Example 5 (Comparative Example)

In this example, a glass-ceramic lamp reflector substrate available from the market was characterized by using TEM. A sample was prepared in substantially the same way as described in Example 4.

Figure 7:
FIGS. 7 and 8 are the cross-sectional TEM photomicrographs of a commercial sample glass-ceramic lamp reflector substrate.
Figure 8:
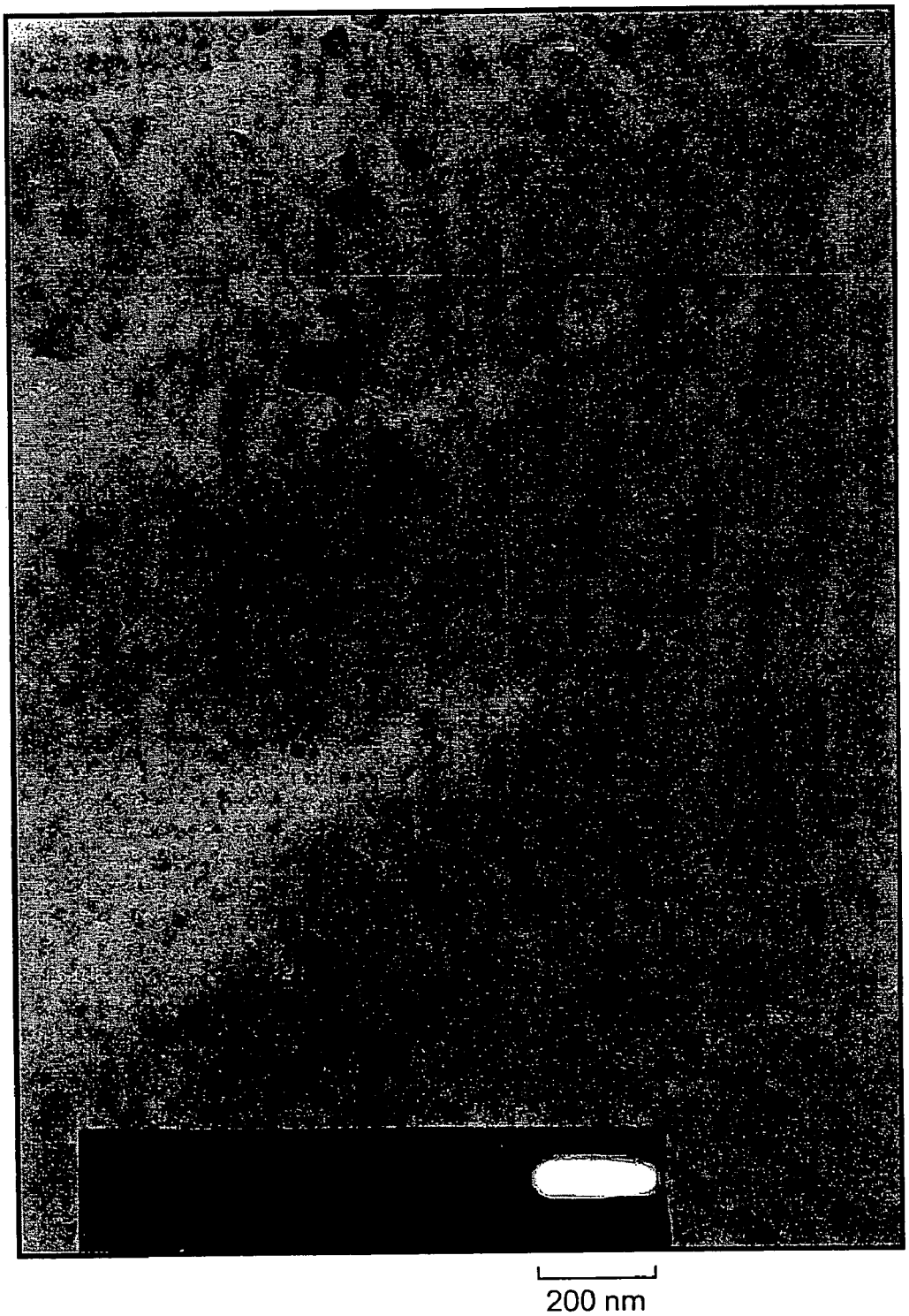

FIGS. 7 and 8 are the images of this commercial sample. FIG. 7 shows the multiple layers of the cold mirror reflection coating and the area of the specimen underneath the coating layers. No ceramic crystal grains were observed underneath the coating layers to approximately 500 nm deep. However, areas underneath the coating deeper than 500 nm in the image were too thick to identify the ceramic crystal grains. Thus the thickness of the amorphous layer underneath the surface of this specimen was at least 500 nm. Thus in the glass-ceramic substrate of this commercial sample, there is a surface glass layer at least 500 nm thick. FIG. 8 is an image showing the grains inside the specimen.

Example 6 (Comparative Example)

In this example, another commercially available glass-ceramic lamp reflector substrate was characterized by using TEM. A sample was prepared in substantially the same way as described in Example 4.

Figure 9:
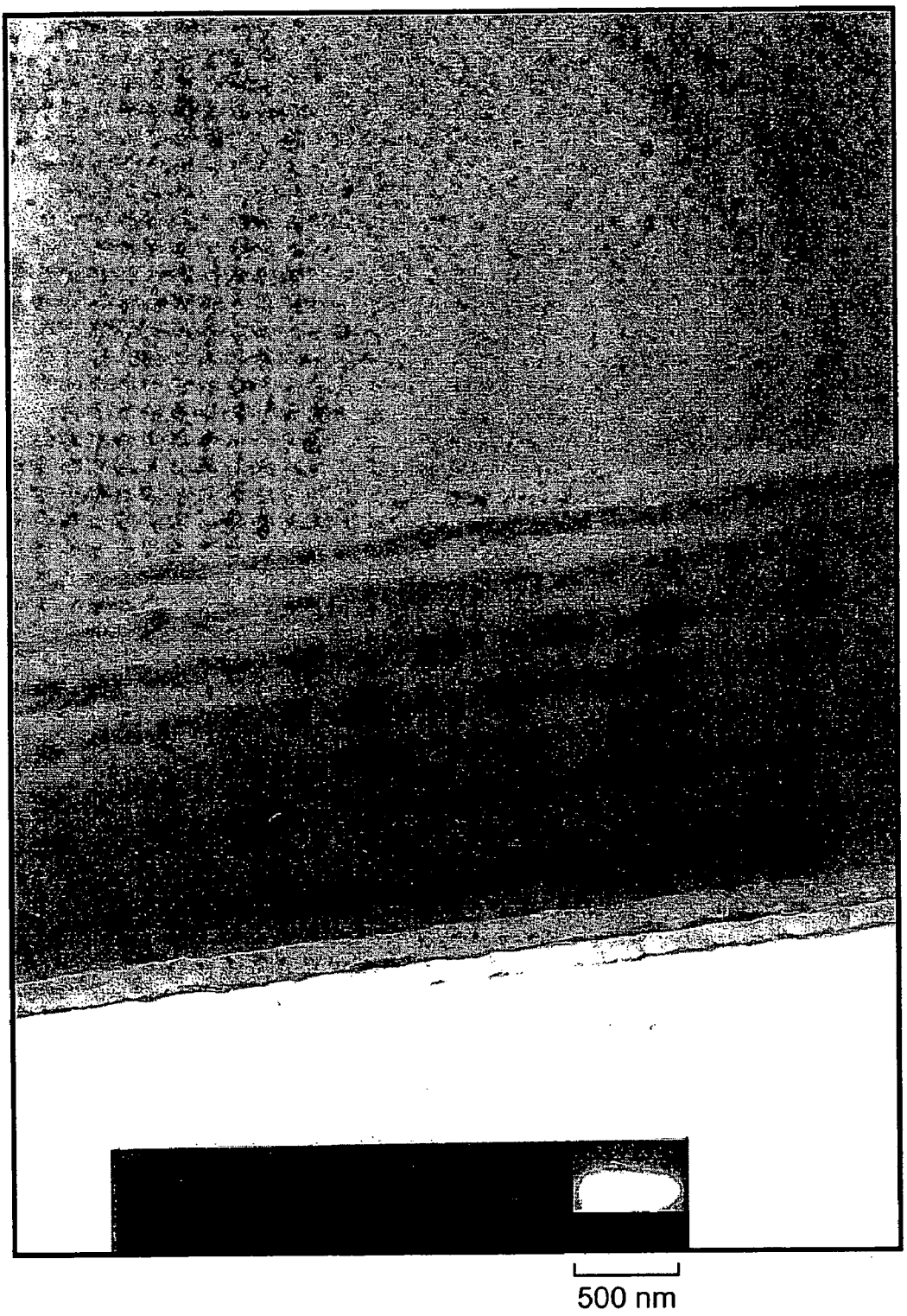
FIGS. 9, 10, 11 and 12 are the cross-sectional TEM photomicrographs of another commercial sample glass-ceramic lamp reflector substrate.
Figure 10:
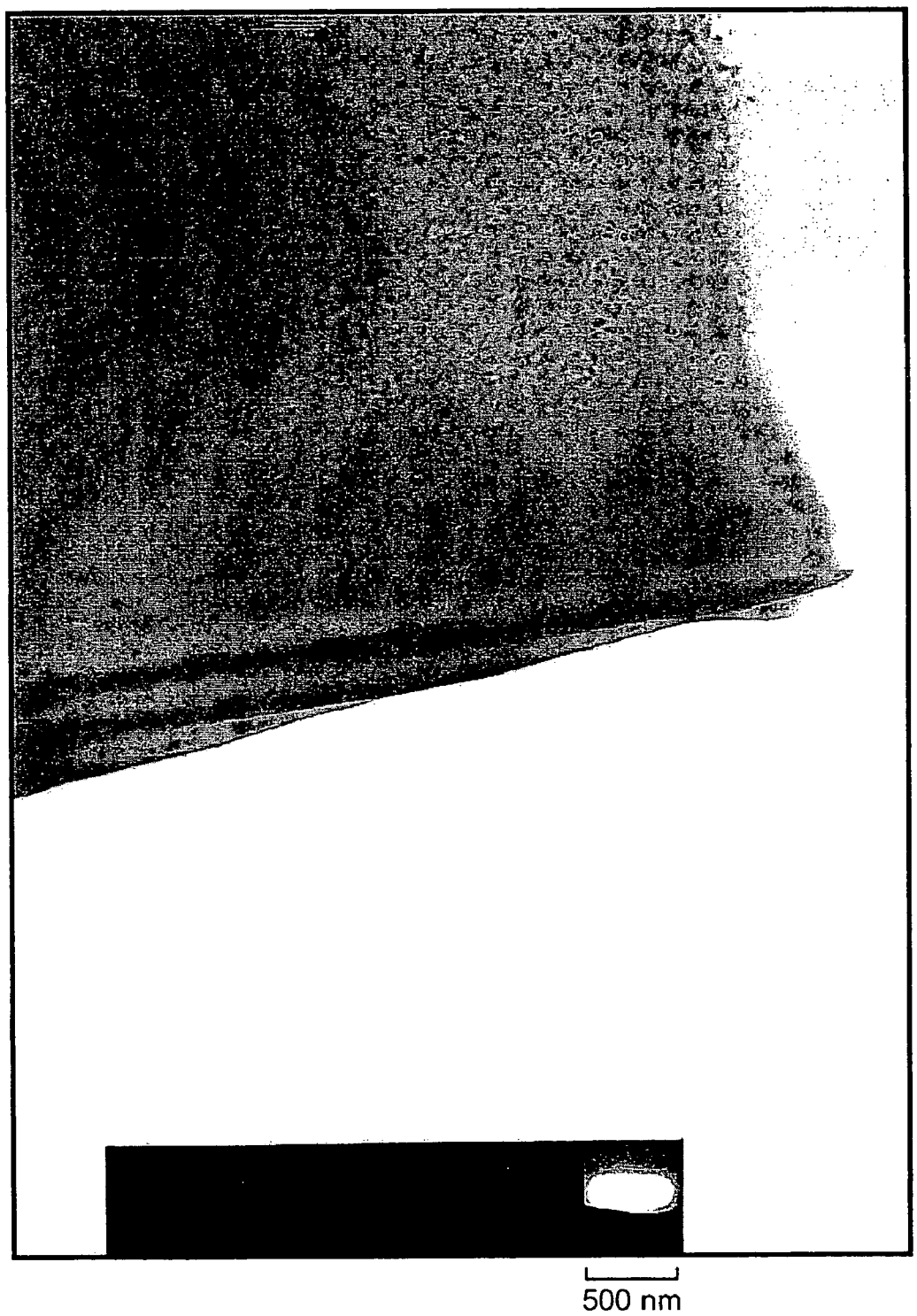
Figure 11:
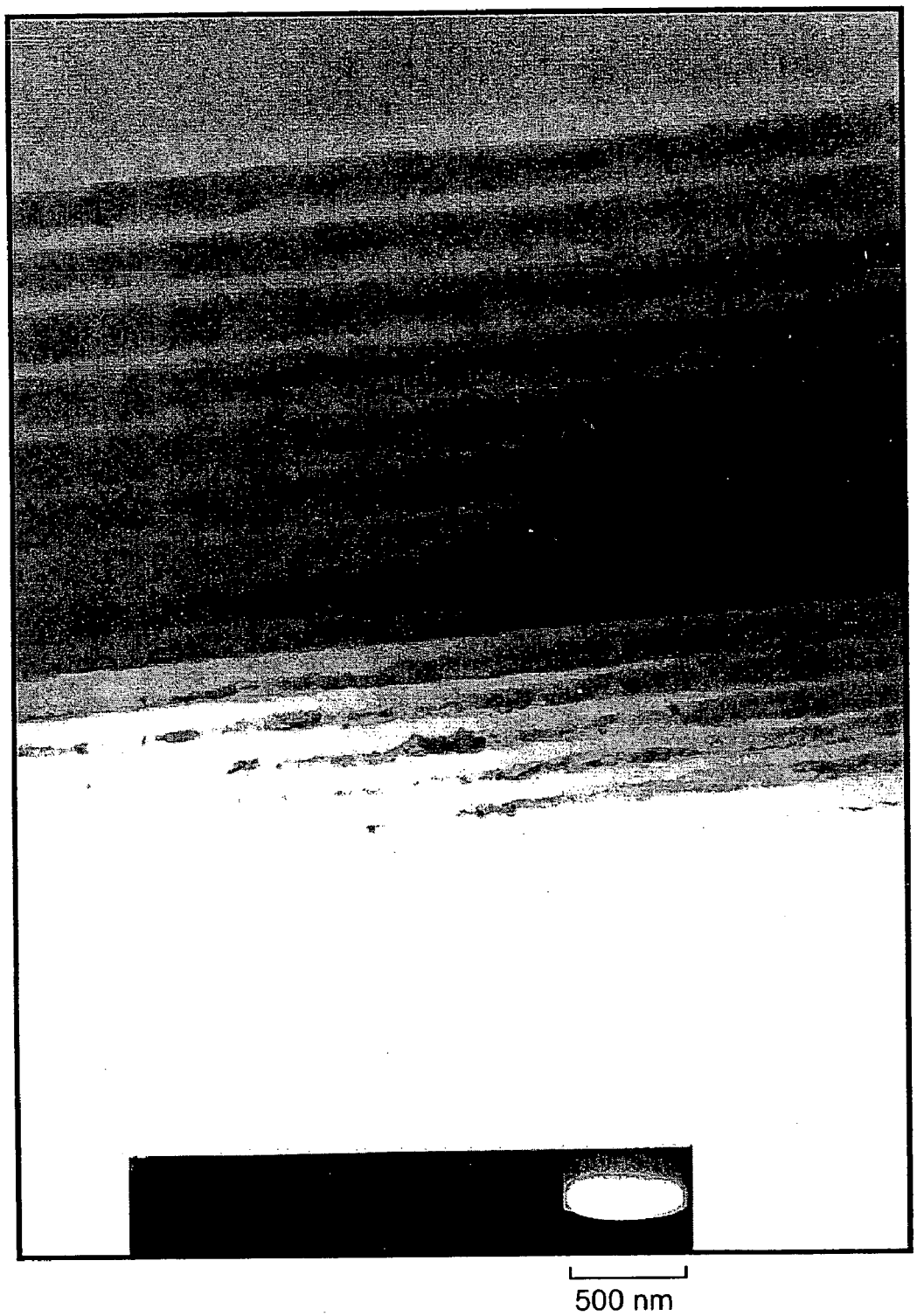
Figure 12:

FIGS. 9, 10, 11 and 12 are TEM images of the commercial sample. FIGS. 9 and 10 show that the thickness of the amorphous layer underneath the surface is about 1 µm. FIG. 11 shows the multilayers of the coating, which are about 30 layers in total. FIG. 12 shows the crystal grains inside the sample. Therefore, in the glass-ceramic substrate (without the surface multi-layer reflective coatings), there is a surface glass layer of about 1 µm.

A comparison of Example 4 to Examples 5 and 6 shows that the glass-ceramic lamp reflector substrate of the present invention has a thinner glass surface layer compared to the commercial samples. It is believed that the glass surface layer has a different CTE from that of the glass-ceramic body of the substrate. As a result of the mismatch of the CTE, microcracking may occur during the ceramming process, hence lowering the production yield, or during the life cycle of the lamp when the lamp is operated at elevated temperatures, leading to reduced lamp performance. Therefore, compared to the commercial products, the glass-ceramic lamp reflector substrate of the present invention should be less prone to micro-crack formation on the surface.

It is generally believed that the ceramming of a glass article can lead to the deterioration of the surface roughness if crystallites form on or near the surface. Therefore, it was believed that a relatively thick remnant glassy surface layer upon ceramming should be conducive to the surface quality of the lamp reflector substrate. This is believed to be the reason why the commercial samples of Examples 5 and 6 have a relatively thick surface glass layer (about 500 nm and 1 µm, respectively). However, it is indicated in Example 3 above that the glass-ceramic lamp reflector substrate of the present invention, with a much thinner glassy layer, still possesses the low surface roughness of the glass molding. This was an unexpected finding for the present inventive material.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A glass material having a composition, by weight of the total composition, comprising 56–67% $SiO_2$; 19–22% $Al_2O_3$; 3.4–3.8% $Li_2O$; 1.8–2.6% ZnO; 1.5–2.5% MgO; 3.3–5% $TiO_2$; 0–2.5% $ZrO_2$; 1.5–3% $B_2O_3$; 0–6% $P_2O_5$; 0–0.6% F; less than 500 ppm $Fe_2O_3$; and components resulting from effective amount of at least one refining agent.

2. A glass material in accordance with claim 1 which comprises 2–4% by weight of $P_2O_5$.

3. A glass material in accordance with claim 1 which comprises 0.3–0.5% of F.

4. A galss lamp reflector substrate containing the glass material of claim 1.

* * * * *